May 19, 1931.    A. M. SAARI    1,806,505
TRANSMISSION
Filed Aug. 8, 1930    5 Sheets-Sheet 1

A. M. Saari,
INVENTOR
BY Victor J. Evans
ATTORNEY

May 19, 1931.  A. M. SAARI  1,806,505
TRANSMISSION
Filed Aug. 8, 1930  5 Sheets-Sheet 3

A. M. Saari,
INVENTOR
BY Victor J. Evans
ATTORNEY

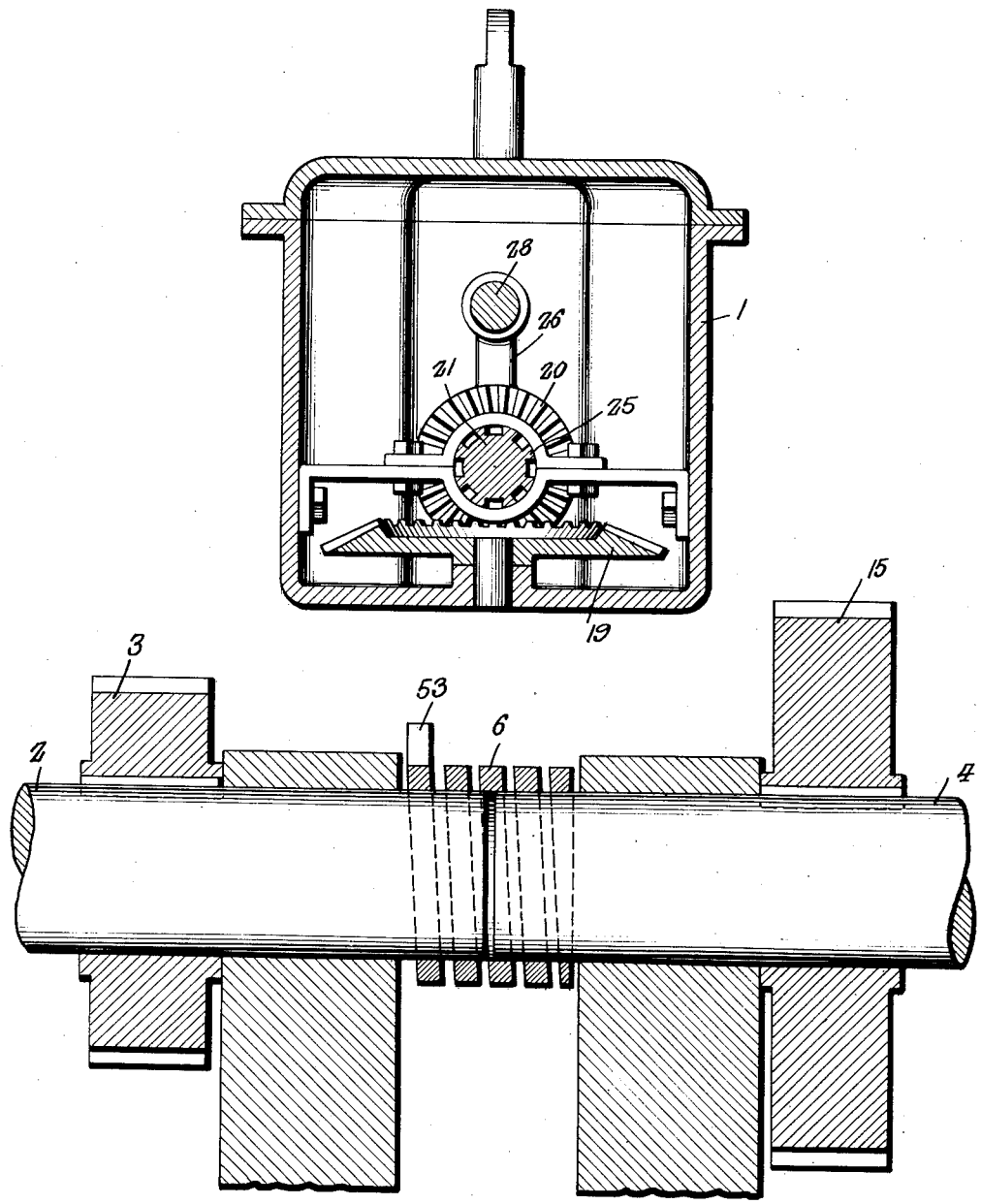

May 19, 1931. A. M. SAARI 1,806,505
TRANSMISSION
Filed Aug. 8, 1930 5 Sheets—Sheet 5
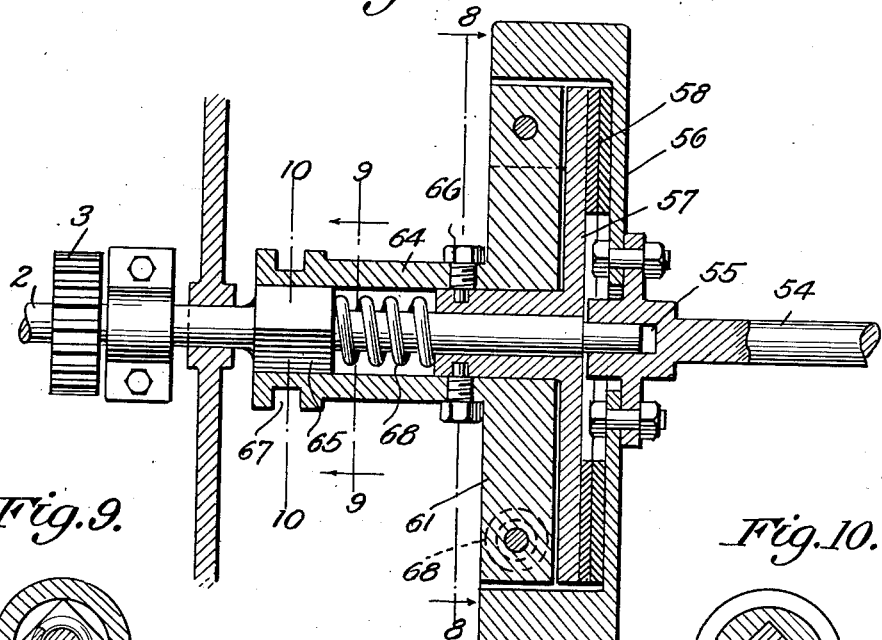
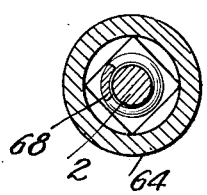
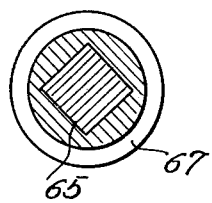
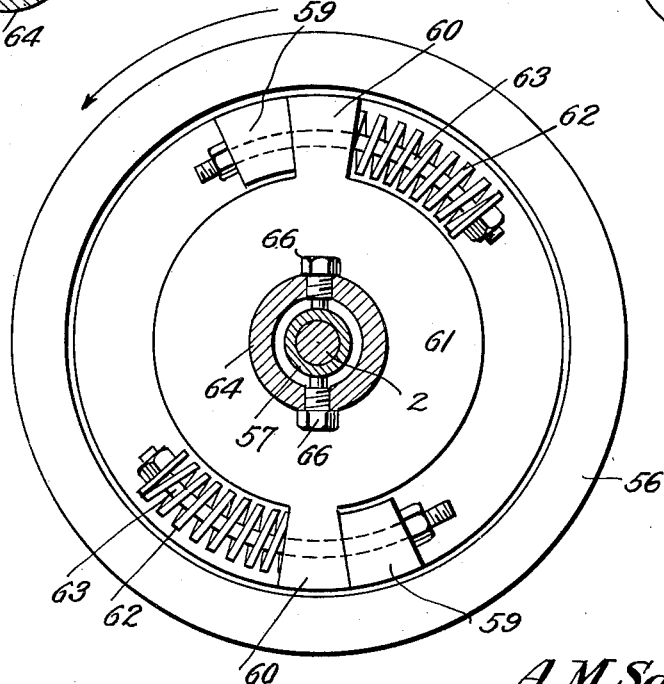
A. M. Saari
INVENTOR
BY Victor J. Evans
ATTORNEY Patented May 19, 1931

1,806,505

UNITED STATES PATENT OFFICE

AUGUST M. SAARI, OF WATTON, MICHIGAN

TRANSMISSION

Application filed August 8, 1930. Serial No. 473,978.

This invention relates to transmission means, the general object of the invention being to provide governor means for automatically controlling the gears, according to the speed of the engine and the load, so that the shifting from one speed to another is done independently of the operator.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 5 is a section on line 5—5 of Figure 2.

Figure 6 is a section on line 6—6 of Figure 1.

Figure 7 is a sectional view showing clutch and shock absorbing means for connecting the transmission with the engine shaft.

Figure 8 is a section on line 8—8 of Figure 7.

Figure 9 is a section on line 9—9 of Figure 7.

Figure 10 is a section on line 10—10 of Figure 7.

Figure 1:
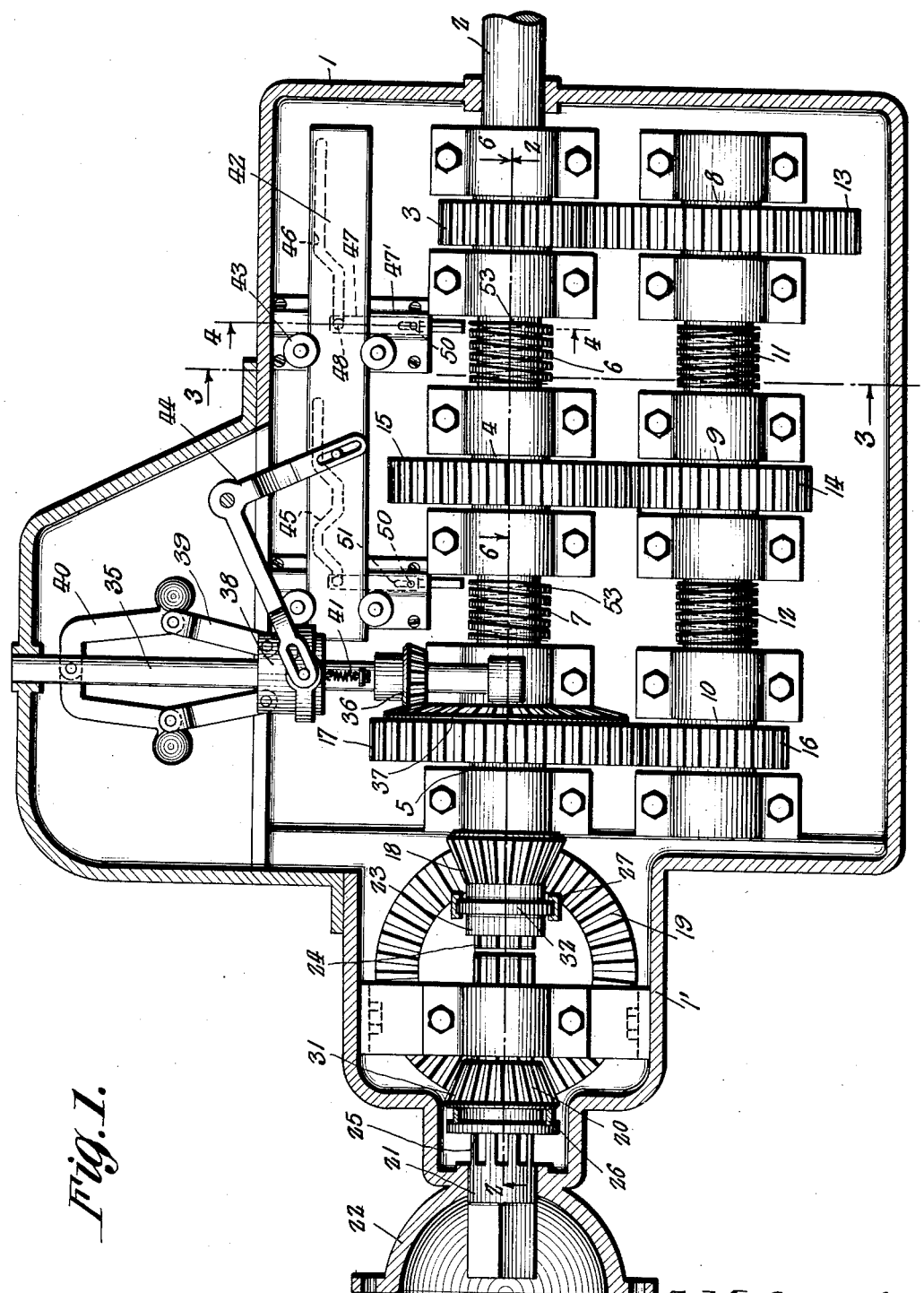
Figure 1 is a longitudinal sectional view through the invention.

In these views, the numeral 1 indicates the transmission housing and 2 indicates the shaft driven from the engine and entering the housing, that part of the shaft within the housing carrying the gear 3. A stub shaft 4 is arranged in the housing and is in alignment with the shaft 2, but is spaced therefrom, and a shaft 5 is also arranged in the housing and in alignment with the shafts 4 and 2 and spaced from the shaft 4. A spiral spring 6 is placed on the adjacent ends of the shafts 2 and 4 and a similar spring 7 is placed on the adjacent ends of the shafts 4 and 5.

Three stub shafts 8, 9 and 10 are arranged in the housing, the shafts being in alignment with each other, with their ends spaced from each other, and a spiral spring 11 is placed on the adjacent ends of the shafts 8 and 9 and a similar spring 12 is placed on the adjacent ends of the shafts 9 and 10. The shaft 8 carries a large gear 13 which meshes with the gear 3, the shaft 9 carries a smaller gear 14 which meshes with a large gear 15 on the shaft 4 and the shaft 10 carries a small gear 16 which meshes with a large gear 17 on the shaft 5. Each spring is so formed that when one shaft is rotating in one direction, it will tend to wind up the spring and thus cause it to grip the adjacent shaft so that said adjacent shaft will be caused to rotate with the first shaft. When the first shaft is rotated in an opposite direction, however, the spring will simply slip thereon without rotating the other shaft.

A beveled gear 18 is carried by the shaft 5 and meshes with an idle gear 19 rotatably supported in an extension 1' at the rear of the housing 1 and a beveled gear 20 is slidably but non-rotatably arranged on a stub shaft 21 which extends into one-half of the housing 22 of the universal coupling (not shown), the outer end of the shaft 21 being of square shape in cross section to engage a part of the coupling, so that movement of this shaft 21 will be communicated to the jack shaft of the vehicle and thus to the wheels.

Figure 2:
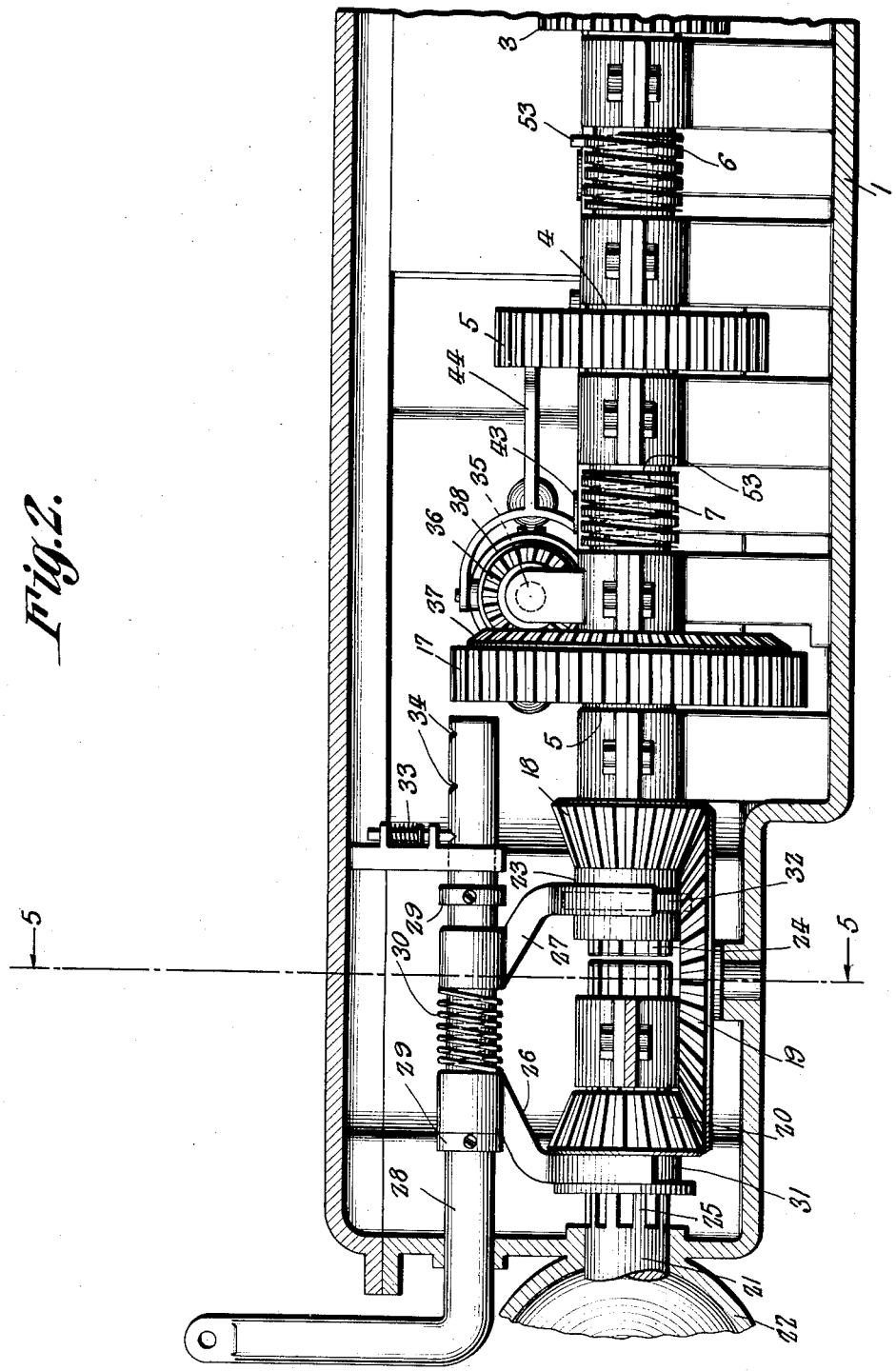
Figure 2 is a section on line 2—2 of Figure 1.
Figure 3:
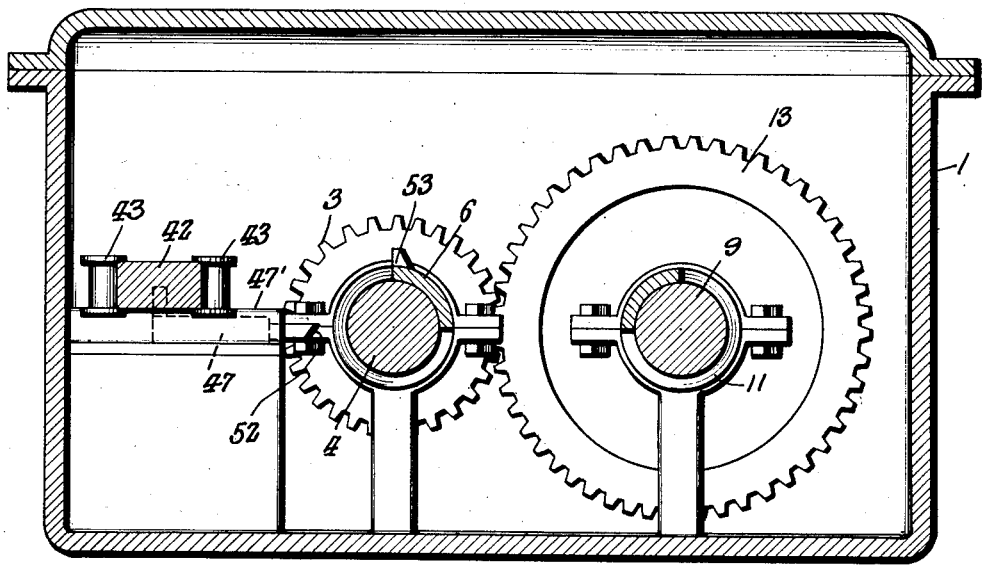
Figure 3 is a section on line 3—3 of Figure 1.
Figure 4:
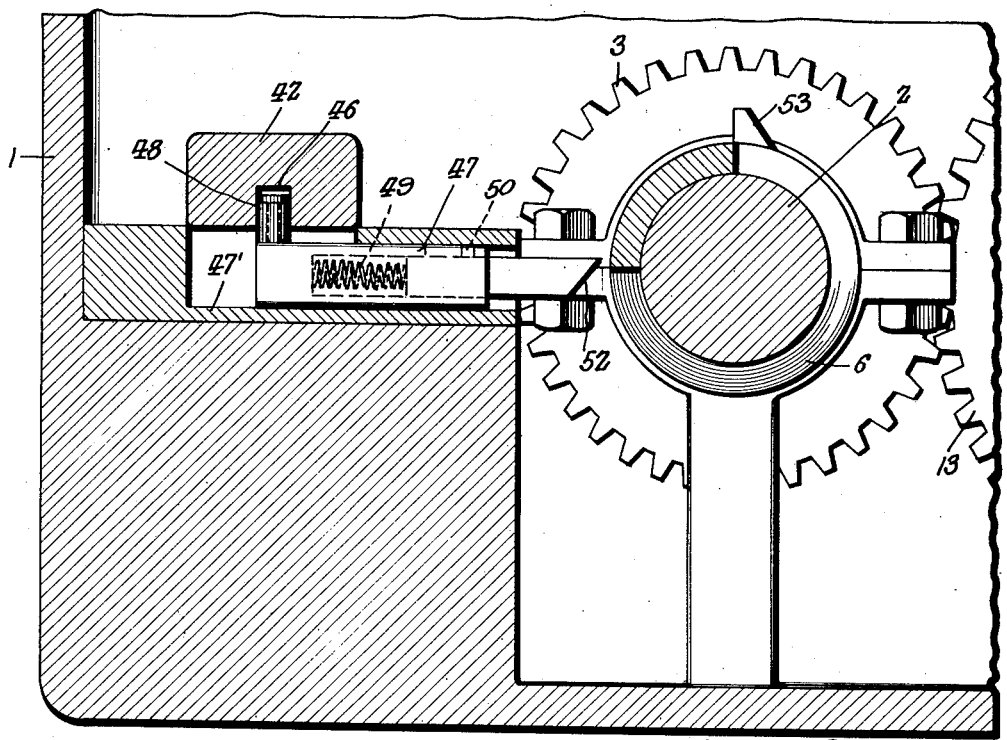
Figure 4 is a section on line 4—4 of Figure 1.

A clutch collar 23 is slidably but non-rotatably connected with the rear end of the shaft 5 which is formed with the teeth 24 for this purpose and the front end of the shaft 21 which is adjacent the rear end of the shaft 24 is also provided with the teeth 25 so that when the clutch collar 23 is shifted to a certain position, its teeth will mesh with the teeth 24 and 25 and thus connect the shaft 21 with the shaft 5. A pair of clutch arms 26 and 27 are arranged on a clutch member 28 between the collars 29 thereon and a spring 30 on the member 28 lies between the arms 26 and 27. The arm 26 engages a groove 31 in the gear 20 and the arm 27 engages a groove 32 in the clutch collar 23. A plunger 33 is adapted to engage any one of three notches 34 in the member 28. When it engages one of these notches, the arms 26 and 27 will position the clutch collar and the gear 20 as shown in Figure 2, so that the idle gear 19 will be driven from the shaft 5 and in turn will drive the shaft 21 through the gear 20. When the member 28 is shifted to a position where the plunger will engage the next notch, the arm 26 will move the gear 20 out of mesh with the gear 19 and the arm 27 will still be out of engagement with the teeth 25 of the shaft 21. Thus the parts are in a neutral position and the shaft 21 will remain idle while the shaft 5 is rotating. When the member 28 is moved to a position where the third notch is engaged by the plunger, the gear 20 will still be out of mesh with the gear 19 and the collar 23 will connect the shafts 24 and 25 together so that the shaft 21 is driven directly by the shaft 5 and thus the vehicle will be moved in a forward direction. With the parts in the position shown in Figure 2, the vehicle will be driven in a reverse direction.

A governor shaft 35 is journaled in the housing 1 and has a gear 36 thereon which meshes with a beveled gear 37 formed on one face of the gear 17. A sliding collar 38 is carried by the shaft to which the links 39 are pivoted, these links being in turn pivoted to the weighted arms 40 so that when the shaft 35 is rotated, the arms will swing outwardly and thus cause the links to move the collar 38 against the action of its spring 41. A block 42 is slidably supported in the housing by means of the rolls 43 and a bell crank 44 communicates the movement of the collar 38 to said block. This block has the two cam grooves 45 and 46 therein and a pair of plungers 47 each has a roller 48 thereon for engaging each groove. These plungers are arranged in the guideways 47' in the housing. Each plunger is of telescopic construction, with a spring 49 tending to hold the outer section with its pin 50 against the outer end of a slot 51. The free end of the outer section is beveled, as shown at 52, and each of the springs 6 and 7 has a projection 53 thereon, one wall of which is straight and the other wall of which is beveled, so that when the beveled end of a plunger strikes the beveled side of a projection, the outer part of the plunger will be pressed upwardly against the action of a spring 49, so that the projection can pass under the plunger without damaging the parts, but when the plunger strikes the straight wall of the projection, the spring is prevented from moving. The cam groove 45 is formed with two high parts and two low parts, while the groove 46 is formed with a low part and a high part.

From the foregoing it will be seen that when the shaft 2 is rotated from the engine through means of a clutch or the like, the spring 6 will start to rotate with the shaft, but as soon as its projection strikes the plunger, the roller of which engages the cam groove 46, the spring will be prevented from further movement and thus it cannot grip the shaft 4, so that said shaft 4 will not be rotated. Thus the movement of the shaft 2 is communicated to the shaft 8 by the gears 3 and 13 and the springs 11 and 12 will communicate the movement of the shaft 8 to the shafts 9 and 10 and movement of the shaft 10 will be communicated to the shaft 5 through the gears 16 and 17, and the movement of shaft 5 will be communicated to the jack shaft through the reversing means in one direction or the other, according to the position of such reversing means. This is the first speed. As will be seen, the governor shaft is rotated from the gear 17 and as the engine picks up speed, the collar 38 will rise under the action of the weighted arms of the governor and thus cause the bell crank 44 to move the block 42. This movement will cause the roller of the plunger to pass into the high part of the cam groove 45, while the roller of the other plunger remains in the low part of the groove 46. Thus the spring 7 is free to rotate with the shaft 4 so that it will grip the shaft 5 and then the drive will be from shaft 2, gears 3 and 13, shafts 8 and 9, gears 14 and 15, shaft 4, spring 7 and shaft 5. This gives the second speed. When the engine picks up on this second speed, the governor moves the block 42 another step, causing the cam groove 46 to raise its plunger and the groove 45 to lower its plunger, so that the spring 7 is held and the spring 6 is released. The drive is then from shaft 2 to shaft 4, gears 15 and 14 to shaft 9, spring 12 to shaft 10 and gears 16 and 17 to shaft 5. This gives the third speed. When the engine picks up on this third speed, the governor moves the block 42 another step so that both plungers are raised and then the drive is directly from shaft 2 to shaft 4 to shaft 5, which gives the fourth or high speed. As before stated, by manipulating the member 28, the gears in the extension 1' of the housing can be placed in neutral position so that the vehicle will not be driven from the engine or such means can be placed in reverse to back the vehicle at either one of four speeds or they can be placed in a forward position to drive the vehicle in a forward direction at either one of four speeds.

Figures 7, 8, 9 and 10 show a combined clutch and shock absorber for connecting the transmission with the engine shaft. As shown in these views, the shaft 2 which carries the gear 3 has a reduced forward end which is journaled in a part of the crank shaft 54 of the engine, as shown at 55. A clutch member 56 is connected with the crank shaft and a second clutch member 57 is loosely arranged on the shaft 2 and is located in the member 56. The members 56 and 57 carry the friction means 58 which engage each other when the clutch parts are in operative position and the member 57 carries the inwardly extending ears 59 which are normally held against the ears 60 on a disk 61 through means of the springs 62 carried by the arcuate rods 63 which pass through the ears 59 and 60. The disk 61 is rotatably arranged on the hub of the member 57 and has a hub 64 having a square interior part for engaging a square part 65 on the shaft 2.

The hub of the part 57 is formed with an annular groove to receive the inner ends of the set screws 66 carried by the hub 64 so that when a clutch lever or the like is actuated, the prongs thereof, engaging the annular groove 67 in the hub 64, will move the clutch 57 out of contact with the clutch part 56 so that the shaft 2 is disconnected from the drive shaft 54. A spring 68 on the shaft 2 normally holds the part 57 against the part 56 so that the shaft 2 will be driven from the shaft 54.

As will be seen, when the clutch parts are in operative position, the part 57 will be driven from the part 56 and the motion of the part 57 will be communicated to the part 61 through means of the springs 62 and as said part 61 is connected to the shaft by the square part 65, said shaft 2 will be rotated. The springs 62 act as shock absorbers and prevent the vehicle from jerking when the transmission means are shifted automatically.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. Transmission means comprising a driven shaft, a second shaft in alignment therewith, a spiral spring on the adjacent ends of the shaft, a second pair of aligned shafts parallel to the first shafts, a pair of gears connecting each shaft of one pair with a shaft of the other pair, a spiral spring connecting the second pair of shafts together, each spring acting to transmit the movement of a shaft of one pair to the other shaft of the pair and means for holding one of the springs stationary when desired, so as to prevent said spring from transmitting the movement of one shaft to the opposing shaft.

2. Transmission means comprising a number of aligned shafts, a second set of aligned shafts, spiral springs connecting the shafts of each set together so that the springs will transmit motion of one shaft to another, a pair of gears connecting each shaft of one set with a shaft of the other set and means for holding any or all of the springs of one shaft against rotation when desired so as to prevent said springs from transmitting the movement of one shaft of a set to another shaft of the set.

3. Transmission means comprising a set of aligned shafts, spiral springs connecting the adjacent ends of the shafts together and acting to impart movement from one shaft to another when the springs are rotated by some of the shafts, a second set of aligned shafts, spiral springs connecting the adjacent ends of the shafts together, gears connecting each shaft of one set to a shaft of the other set and governor actuated means for controlling the rotary movement of the springs of one set whereby the speeds of the apparatus to which the transmission is connected are automatically controlled.

4. Transmission means comprising a housing, a drive shaft extending into the housing, a driven shaft in the housing, an intermediate shaft between the drive shaft and the driven shaft, spiral springs connecting the adjacent ends of the intermediate shaft with the other shafts, three aligned shafts arranged parallel to the other shafts, spiral springs connecting the ends of the three shafts together, a pair of gears connecting each shaft of one set with a shaft of the other set, a member slidably supported in the housing and having a pair of cam grooves therein, plungers supported in the housing and having projections thereon engaging the cam grooves, a projection on each of the springs of the first set of shafts which are engaged by the plungers when the same have been projected by the cam grooves whereby the springs will be prevented from rotating with the shafts so that one shaft will be disconnected from the adjacent shaft, the cam grooves being of different shape, a governor driven from one of the shafts and means for actuating the sliding member by the movement of the governor.

In testimony whereof I affix my signature.

AUGUST M. SAARI.